United States Patent
Yamaguchi et al.

(10) Patent No.: US 7,950,724 B2
(45) Date of Patent: May 31, 2011

(54) VEHICLE BODY REAR STRUCTURE

(75) Inventors: Toshizumi Yamaguchi, Wako (JP); Satoru Kawabe, Wako (JP); Takumi Tsuyuzaki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 272 days.

(21) Appl. No.: 12/016,585

(22) Filed: Jan. 18, 2008

(65) Prior Publication Data

US 2009/0001767 A1 Jan. 1, 2009

(30) Foreign Application Priority Data

Jan. 19, 2007 (JP) ................................. 2007-010055

(51) Int. Cl.
*B62D 21/02* (2006.01)
(52) U.S. Cl. .......... 296/187.11; 296/193.08; 296/203.04
(58) Field of Classification Search ............. 296/187.03, 296/187.11, 193.08, 203.04; 280/830, 784
See application file for complete search history.

(56) References Cited

U.S. PATENT DOCUMENTS

| | | | |
|---|---|---|---|
| 6,834,910 B2 | 12/2004 | Wendland et al. | |
| 7,513,329 B2 * | 4/2009 | Nakashima et al. | 180/312 |
| 7,552,963 B2 * | 6/2009 | Yamaguchi et al. | 296/187.08 |
| 7,594,559 B2 * | 9/2009 | Kitoh et al. | 180/232 |
| 2006/0214414 A1 * | 9/2006 | Wehner et al. | 280/784 |
| 2007/0096508 A1 * | 5/2007 | Rocheblave et al. | 296/193.07 |
| 2009/0309349 A1 * | 12/2009 | Yamanami et al. | 280/830 |

* cited by examiner

*Primary Examiner* — Jason S Morrow
(74) *Attorney, Agent, or Firm* — Rankin, Hill & Clark LLP

(57) ABSTRACT

A vehicle body rear structure, which includes a rear frame disposed on each side of a vehicle body; and a tank lower frame disposed beneath the rear frame and on the each side of the vehicle body. The rear frame has a load-displacement characteristic having a ratio F/S of load F to displacement S larger than the ratio F/S of the tank lower frame. A cross sectional deformation of the tank lower frame is suppressed so that the load does not rapidly decrease after reaching a maximum of a bending strength.

12 Claims, 9 Drawing Sheets

VEHICLE BODY REAR STRUCTURE

CROSS REFERENCE TO RELATED APPLICATIONS

This application claims the foreign priority benefit under Title 35, United States Code, §119(a)-(d) of Japanese Patent Application No. 2007-010055, filed on Jan. 19, 2007, the contents of which are hereby incorporated by reference.

BACKGROUND OF THE INVENTION

1. Field of the Invention

The present invention relates to a vehicle body rear structure.

2. Description of Related Art

Conventionally, a vehicle body rear structure provided with approximately a Y-shaped stiffening structure in plane view has been known. This is disclosed in, for example, U.S. Pat. No. 6,834,910. FIG. 11A is a bottom plane view schematically showing a conventional vehicle body rear structure as seen from a bottom side of a vehicle body. FIG. 11B is a side view schematically showing a conventional vehicle body rear structure as seen from a side of the vehicle body.

As shown in FIG. 11A, the stiffening structure is formed in approximately the Y-shape by a support member 109 and a pair of tension-compression bars 101 (tank lower frames). The support member 109 is disposed at approximately a center of a vehicle body B in a vehicle width direction, and extends in a front-rear direction of the vehicle body B. A rear end of the support member 109 is jointed to a cross support member 106 (rear floor end cross member), and a front end of the support member 109 is jointed to a receiving bracket 110. It is noted that the cross support member 106 is jointed to each rear end portion of the rear frames 102.

Each rear end of the tension-compression bars 101 is jointed to the receiving bracket 110 at a position close to a center of the vehicle body B in the vehicle width direction, and each front end of the tension-compression bars 101 extending to each of side sills 105 in approximately a V-shape is jointed to the each of the side sills 105.

The vehicle body rear structure described above has a reinforced structure from the cross support member 106 disposed on a rear side of the vehicle body B to the side sills 105 disposed on right and left sides of the vehicle body B via the support member 109, receiving bracket 110, and tension-compression bars 101.

However, in the vehicle body rear structure, as shown in FIG. 11B, the support member 109 has been disposed to be inclined downward from the cross support member 106 to the receiving bracket 110. Therefore, when a load upon a rear-end collision is input to the cross support member 106, there has been a possibility that the load may not be sufficiently transmitted to the receiving bracket 110 from the cross support member 106 via the support member 109. As a result, in the conventional vehicle body rear structure described above, it has been difficult to effectively disperse the input load from the receiving bracket 110 to the tension-compression bars 101 and side sills 105 via the tension-compression bars 101.

Therefore, for solving the above issue, a vehicle body rear structure may be conceivable, in which the support member 109 is horizontally disposed and jointed between the cross support member 106 and receiving bracket 110. Therefore, in the vehicle body rear structure described above, a load input from the cross support member 106 upon a rear-end collision is transmitted to the tension-compression bars 101 via the support member 109, which is disposed horizontally.

However, in the vehicle body rear structure, when the tension-compression bars 101 are deformed by a large load upon a rear-end collision, a load-displacement characteristic of an ordinary tension-compression bars 101, which are formed by a hollow member (tubular member), shows a rapid decrease of the load after reaching a maximum of the load, which increases in response to the displacement. Therefore, the vehicle body rear structure described above can not sufficiently bear the large load input upon the rear-end collision.

In addition, in the conventional vehicle body rear structure, if front and rear portion structures of the stiffening members such as the support member 109, receiving bracket 110, and tension-compression bars 101, and strengths of the stiffening members are not balanced, it is difficult to deform the vehicle body rear structure by turns upon a rear-end collision from a rear portion of the structure. As a result, in the vehicle body rear structure, uncrushed portions are left in these stiffening members, thereby resulting in insufficient collision energy absorption upon the rear-end collision.

In addition, in the vehicle body rear structure, if the structures and strengths are not balanced as described above, an increase of a strength of each of the stiffening members is required for improving the strength of the vehicle body rear structure and collision energy absorption performance. Specifically, it is required to, for example, increase thicknesses of materials forming the stiffening members and cross sections of the stiffening members, or to apply a material having a higher strength to the stiffening members. As a result, in the vehicle body rear structure, a weight and manufacturing cost of the vehicle body rear structure are increased.

It is, therefore, an object of the present invention to provide a vehicle body rear structure which can bear a large load upon a rear-end collision and has an excellent collision energy absorption performance, in addition to enabling reductions in weight and manufacturing cost of the vehicle body rear structure.

SUMMARY OF THE INVENTION

A vehicle body rear structure according to the present invention, which has solved the issues described above, is characterized as follows.

According to a first aspect of the present invention, there is provided a vehicle body rear structure, which includes: a rear frame disposed on each side of a vehicle body; and a tank lower frame disposed beneath the rear frame and on the each side of the vehicle body, wherein the rear frame has a load-displacement characteristic having a ratio F/S of load F to displacement S larger than the ratio F/S of the tank lower frame, wherein a cross sectional deformation of the tank lower frame is suppressed so that the load does not rapidly decrease after reaching a maximum of a bending strength.

In the vehicle body rear structure described above, since the cross sectional deformation (deformation of the cross section) of the tank lower frame is suppressed, the tank lower frame shows the load-displacement characteristic in which the load does not rapidly decrease after reaching the maximum of the load which increases in response to the displacement, and maintains a predetermined load, while increasing the displacement.

A load-displacement characteristic of the whole vehicle body rear structure has a maximum load which is a sum of a maximum load of the rear frame and the predetermined load maintained by the tank lower frame.

Therefore, the vehicle body rear structure described above can bear a large load input upon a rear-end collision, compared with the vehicle body rear structure provided with the conventional stiffening member In addition, in the vehicle body rear structure, since the tank lower frame displaces (deforms) while maintaining the predetermined load, a required strength of the whole vehicle body rear structure can be obtained without increasing strengths of other frames such as the rear frame. Therefore, in the vehicle body rear structure, it is unnecessary to increase thicknesses and cross sections of materials forming the other frames, and to use a high-strength material for the other frames.

Accordingly, reductions in weight and manufacturing cost can be achieved in the vehicle body rear structure described above.

In addition, in the vehicle body rear structure described above, it is preferable that the tank lower frame is made of a hollow member, and the cross sectional deformation is suppressed by making a side wall of the tank lower frame thicker than upper and bottom walls of the tank lower frame.

According to the vehicle body rear structure described above, the cross sectional deformation of the tank lower frame can be suppressed with a simple structure.

In addition, in the vehicle body rear structure described above, the tank lower frame may be made of a hollow member, and the cross sectional deformation may be suppressed by disposing at least one of a rib, a plate, and a filler inside the tank lower frame.

In addition, in the vehicle body rear structure described above, it is preferable that the tank lower frame is designed such that a bending deformation of the tank lower frame takes place in a direction getting away from a fuel tank. For example, the tank lower frame may be formed to protrude in a direction opposite to the fuel tank. According to the vehicle body rear structure described above, the tank lower frame can be certainly bending-deformed in a direction not to interfere with the fuel tank.

In addition, in the vehicle body rear structure described above, the tank lower frame may have a trigger for the bending deformation on a fuel tank side.

In addition, in the vehicle body rear structure described above, an inflection point of the tank lower frame may be set so that a neutral axis of the tank lower frame protrudes in a direction opposite to the fuel tank.

In addition, in the vehicle body rear structure described above, a cross sectional shape of the tank lower frame and a thickness of a plate forming the tank lower frame may be constant in a longitudinal direction of the tank lower frame, and the inflection point may be set by forming an external shape of the tank lower frame so that an extending direction of the tank lower frame 1 is displaced.

In addition, in the vehicle body rear structure described above, the inflection point may be set by varying a thickness distribution and material strength of a plate forming the tank lower frame in a longitudinal direction of the tank lower frame.

In addition, in the vehicle body rear structure described above, the tank lower frame may include a rib extending along a longitudinal direction of the tank lower frame, and the inflection point may be set by disposing the rib.

In addition, the vehicle body rear structure may further includes: a spare pan frame; and a rear floor cross member, wherein the spare pan frame is jointed to the rear floor cross member.

In addition, in the vehicle body rear structure described above, the tank lower frame may transmit a load upon a rear-end collision to a framework, which is located ahead of the tank lower frame, of the vehicle body.

The vehicle body rear structure according to the present invention can bear a large load upon a rear-end collision and has an excellent collision energy absorption performance, in addition to enabling reductions in weight and manufacturing cost of the vehicle body rear structure.

DETAILED DESCRIPTION OF THE PREFERRED EMBODIMENT

Figure 1A:
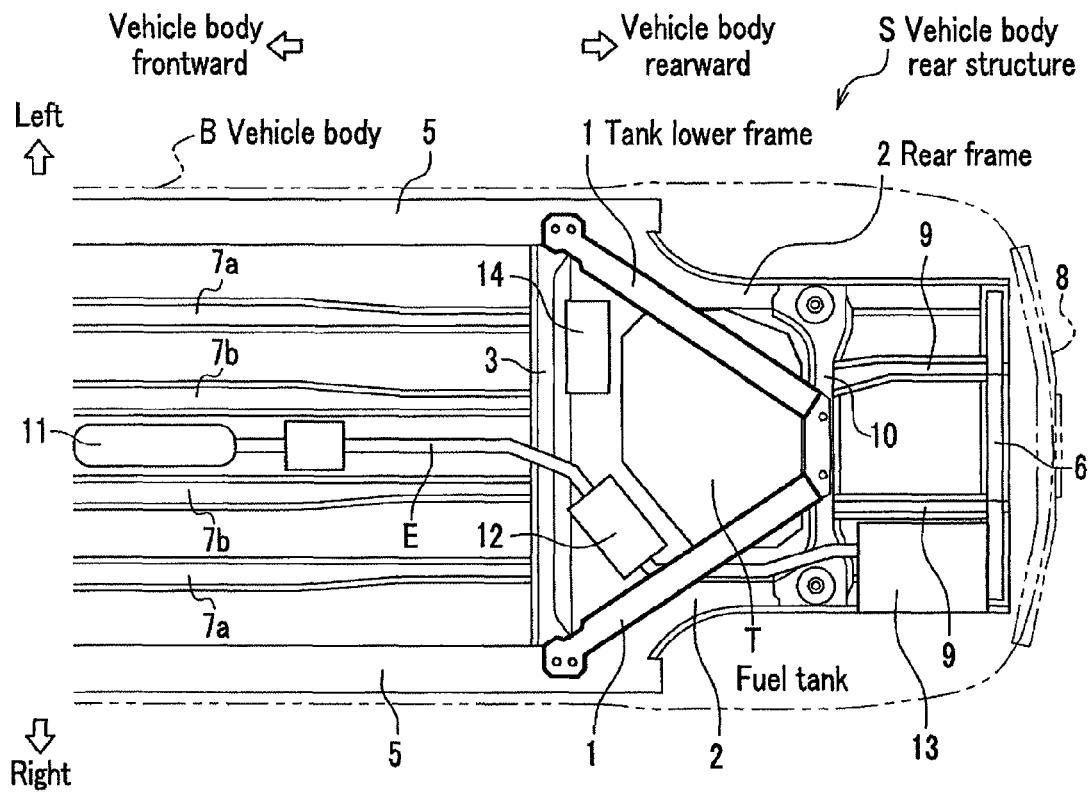
FIG. 1A is a bottom plane view schematically showing a vehicle body structure including a vehicle body rear structure according to an embodiment of the present invention.
Figure 1B:
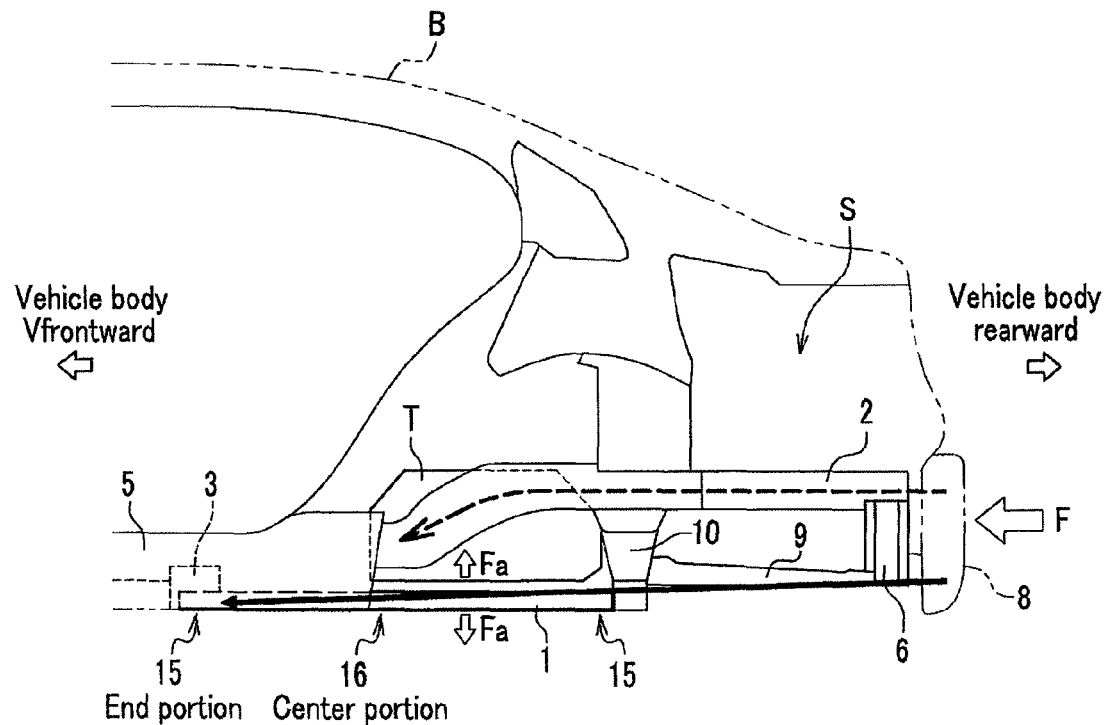
FIG. 1B is a side view schematically showing the vehicle body rear structure according to the embodiment.
Figure 2:
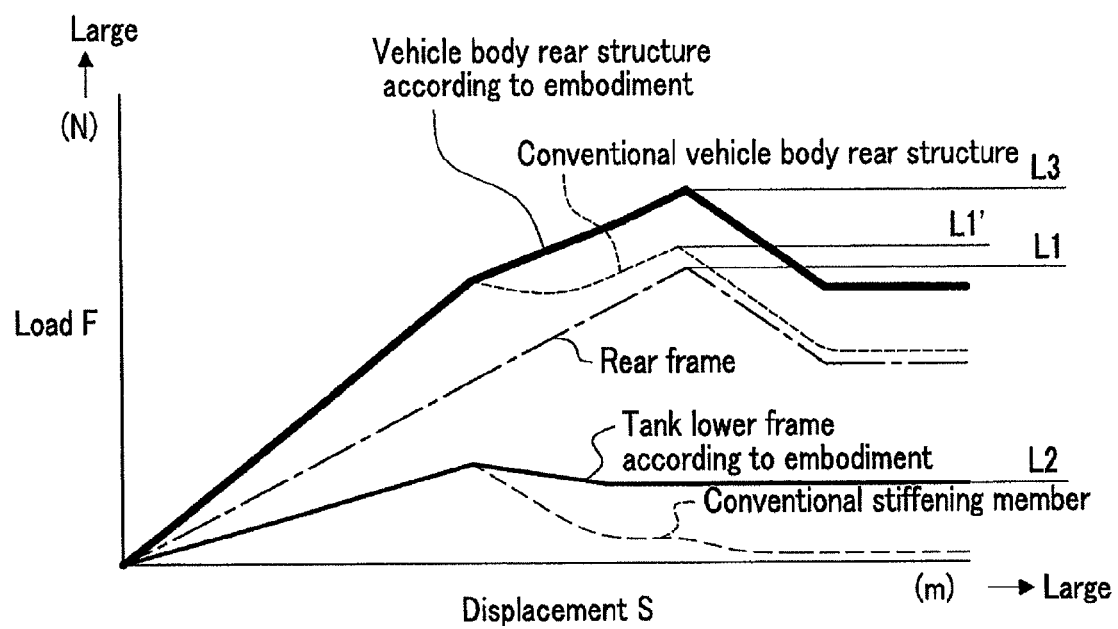
FIG. 2 is a graph showing a load-displacement characteristic of the vehicle body rear structure according to the embodiment, in which a vertical axis and a horizontal axis indicate a load (N) and a displacement (m), respectively.
Figure 3A:
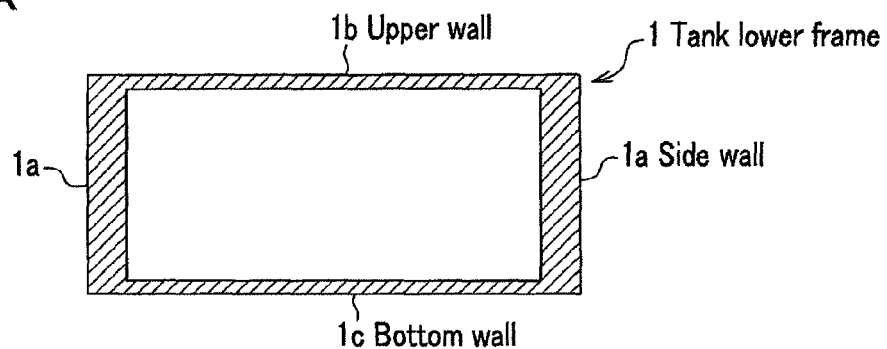
FIG. 3A is a cross sectional view of a tank lower frame used for a vehicle body rear structure according to the embodiment.

Next, a vehicle body rear structure according to embodiments of the present invention will be explained in detail by referring to drawings as needed. FIG. 1A is a bottom plane view schematically showing a vehicle body structure including a vehicle body rear structure according to an embodiment. FIG. 1B is a side view schematically showing the vehicle body rear structure according to the embodiment. FIG. 2 is a graph showing a load-displacement characteristic of a vehicle body rear structure according to the embodiment. FIG. 3A is a cross sectional view of a tank lower frame used for a vehicle body rear structure according to the embodiment. FIG. 3B to FIG. 3H are cross sectional views showing modified samples of the tank lower frame.

It is noted that the cross sectional views shown in FIG. 3A to FIG. 3H show cross sections perpendicular to neutral axes of the tank lower frames. In addition, in the explanations hereinafter, directions of left, right, top and bottom are based on the left, right, top and bottom of a vehicle (automobile) which is normally on the ground.

As shown in FIG. 1A, a vehicle body rear structure S according to the embodiment is characterized in that the vehicle body rear structure S includes a pair of tank lower frames 1 to be disposed beneath a fuel tank T, and the tank lower frames 1 show a load-displacement characteristic (FIG. 2) as described later.

Here, first, a whole vehicle body structure including the vehicle body rear structure S according to the embodiment will be explained.

In the vehicle body structure, the vehicle body rear structure S includes rear frames 2, a pair of side sills 5, a pair of front floor frames 7a, and tunnel frames 7b. The rear frames 2 extend in a front-rear direction of a vehicle body B on both right and left sides of a rear portion of the vehicle body B. The pair of the side sills 5 extend to a front of the vehicle body B from the rear frames 2. The pair of the front floor frames 7a extend to an area between the right and left side sills 5 in the front-rear direction of the vehicle body B. The tunnel frames 7b extend to an area between the front floor frames 7a in the front-rear direction of the vehicle body B.

In addition, the vehicle body rear structure S further includes a rear floor end cross member 6, a rear floor cross member 10, and a middle floor cross member 3. The rear floor end cross member 6 is located in front of a bumper beam 8 and extends in a vehicle width direction to be jointed to each rear end of the rear frames 2. The rear floor cross member 10 is located ahead of the rear floor end cross member 6 and extends in the vehicle width direction to be jointed to each of the rear frames 2. The middle floor cross member 3 is located on rear end sides of the front floor frames 7a and extends in the vehicle width direction to be jointed to each of the front floor frames 7a and each of the side sills 5. It is noted that a rear floor panel, which is not shown, extends toward a rear portion (toward rear floor end cross member 6) of the vehicle body B from the middle floor cross member 3.

In addition, the vehicle body rear structure S includes a pair of spare pan frames 9 which extend in the front-rear direction between the rear floor end cross member 6 and rear floor cross member 10 to be jointed to the rear floor end cross member 6 and rear floor cross member 10. Each of the spare pan frames 9 is arranged to be located on each side of a spare pan (not shown) which is disposed in a rear portion of the rear floor panel and has a concave portion for storing a spare tire. As shown in FIG. 1B, the spare pan frames 9 are disposed substantially horizontally from the rear floor end cross member 6 to rear floor cross member 10. It is noted that the rear frames 2, rear floor end cross member 6, spare pan frames 9, and rear floor cross member 10 according to the embodiment are made of a channel-shaped member, for example, a U-shaped member, whose upper face is open.

Next, the tank lower frames 1 described above will be explained in detail.

As shown in FIG. 1A, each rear end of the tank lower frames 1 are jointed to substantially a center of the rear floor cross member 10 in the vehicle width direction. In addition, each of the tank lower frames 1 extends substantially in a V-shape toward each side of the vehicle body B from the rear floor cross member 10, and each front end of the tank lower frames 1 is jointed to each of the side sills 5. Specifically, the each front end of the tank lower frames 1 is jointed to a portion, which is close to a place where the middle floor cross member 3 is jointed, of each of the side sills 5. That is, each of the tank lower frames 1 and each of the rear frames 2 according to the embodiment are disposed in pairs on the right and left sides of the vehicle body B.

As shown in FIG. 1B, the tank lower frames 1 described above are disposed beneath the rear frames 2 and fuel tank T, and extend substantially horizontally toward the middle floor cross member 3 from the rear floor cross member 10. It is preferable that a horizontal height of the tank lower frames 1 is set to be substantially identical to that of the spare pan frames 9. It is noted that in the vehicle body rear structure S according to the embodiment, as shown in FIG. 1A, a muffler E which connects a catalytic converter 11, a chamber 12, and a silencer 13 is disposed so as to pass through beneath the middle floor cross member 3 and above the tank lower frames 1. Meanwhile, a symbol 14 shows an intake canister.

A strength of the tank lower frames 1 described above is set to be lower than that of the rear frames 2. Specifically, when a predetermined load is applied to the tank lower frames 1 and rear frames 2 along each of their longitudinal directions, a bending deflection (hereinafter, referred to as deflection) of the rear frames 2 is set to be small, compared with that of the tank lower frames 1. That is, as shown in FIG. 2, a load-displacement characteristic of the rear frames 2 is designed to be larger than that of the tank lower frames 1. In other words, a ratio (F/S) of load F to displacement S of the rear frames 2 is set to be larger than that of the tank lower frames 1.

In addition, as shown in FIG. 2, if the load-displacement characteristic of the tank lower frames 1 according to the embodiment is compared with that of a hollow member 5 ("conventional stiffening member" in FIG. 2) which is commonly used for a stiffening member, the conventional stiffening member shows a load-displacement characteristic in which the load rapidly decreases after reaching a maximum of the load which increases in response to the displacement. On the contrary, a load-displacement characteristic of the tank lower frames 1 according to the embodiment maintains a predetermined load even after reaching a maximum of the load without rapidly decreasing the load, while increasing the displacement. In other words, the load-displacement characteristic of the tank lower frames 1 described above shows a suppression of a cross sectional deformation of the tank lower frames 1.

As a tank lower frame 1 which can suppress the cross sectional deformation, for example, an example is shown in FIG. 3A, in which a plate thickness of a side wall 1a of the tank lower frame 1 is formed thicker than those of an upper wall 1b and bottom wall 1c. It is noted that a cross sectional shape shown in FIG. 3A shows a cross section perpendicular to a neutral axis of the tank lower frame 1, as described above. That is, when a displacement S (see FIG. 2) of the tank lower frame 1 is caused in response to an input of the load F (see FIG. 2) along a longitudinal direction of the tank lower frame 1, a local deformation of the cross section shown in FIG. 3A is suppressed.

It is noted that the tank lower frame 1 according to the embodiment is not limited to the one shown in FIG. 3A. As shown in FIG. 3B to FIG. 3E, the tank lower frame 1 may be the ones in which a middle wall 1d and a lateral wall 1e are disposed. The middle wall 1d and lateral wall 1e extend along a longitudinal direction of the tank lower frame 1.

Figure 3B:
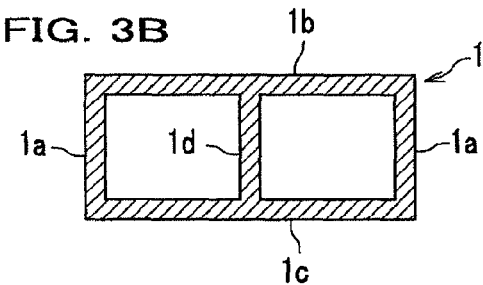
FIG. 3B to FIG. 3H are cross sectional views showing modified samples of the tank lower frame.

The tank lower frame 1 shown in FIG. 3B is provided with the middle wall 1d in a range between the facing side walls 1a for jointing the upper wall 1b and bottom wall 1c.

Figure 3F:
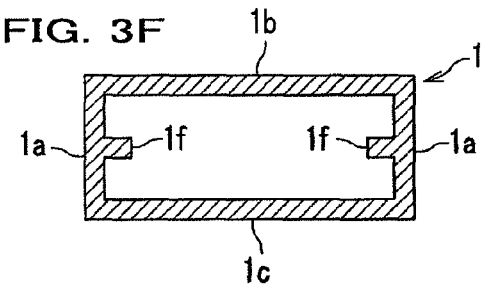
Figure 3C:
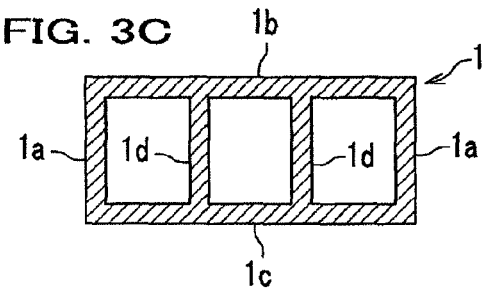

The tank lower frame 1 shown in FIG. 3C differs from that shown in FIG. 3B in that the middle wall 1d is increased to two from one.

Figure 3G:
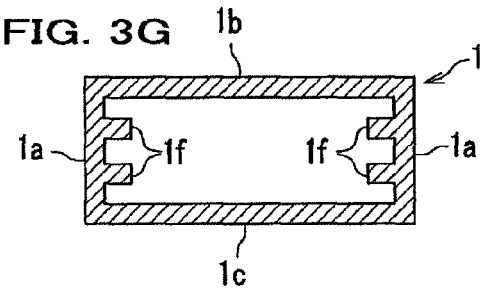
Figure 3D:
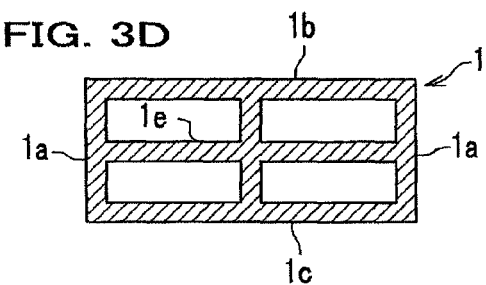

The tank lower frame 1 shown in FIG. 3D differs from that shown in FIG. 3B in that the lateral wall 1e is further disposed in the tank lower frame 1 shown in FIG. 3B between the facing side walls 1a for jointing the walls 1a.

Figure 3H:
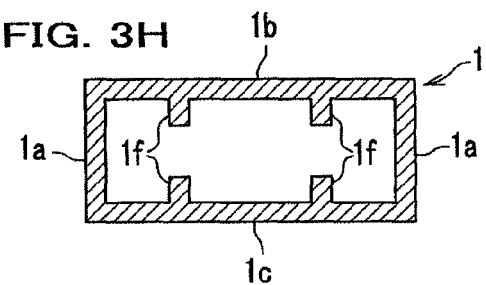
Figure 3E:
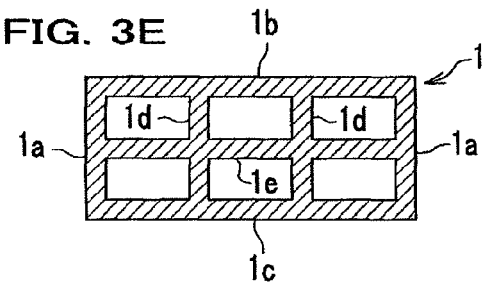

The tank lower frame 1 shown in FIG. 3E differs from that shown in FIG. 3C in that the lateral wall 1e is further disposed in the tank lower frame 1 shown in FIG. 3C between the facing side walls 1a for jointing the walls 1a.

It is noted that thicknesses of the side wall 1a, upper wall 1b, bottom wall 1c, middle wall 1d, and lateral wall 1e are formed constant in a longitudinal direction of the tank lower frame 1. The cross section of the tank lower frame 1 is identical (same shape) in the longitudinal direction of the tank lower frame 1.

It is noted that in the tank lower frame 1 provided with the middle wall 1d and lateral wall 1e, the cross sectional deformation upon a load input is more completely suppressed. As a result, in the tank lower frame 1, the load does not rapidly decrease after reaching a maximum of a bending strength.

In addition, as shown in FIG. 3F to FIG. 3H, the tank lower frame 1 may include a rib 1f in a hollow portion. The rib 1f extends along a longitudinal direction of the tank lower frame 1.

The tank lower frame 1 shown in FIG. 3F has one rib 1f on each of the side walls 1a.

The tank lower frame 1 shown in FIG. 3G has two ribs 1f side by side on each of the side walls 1a.

The tank lower frame 1 shown in FIG. 3H has two ribs 1f side by side on each of the upper wall 1b and bottom wall 1c.

It is noted that in the tank lower frame 1 provided with the rib 1f, the load also does not rapidly decrease after reaching a maximum of the bending strength because the cross sectional deformation is suppressed as with the tank lower frames 1 shown in FIG. 3A to FIG. 3E. In addition, the tank lower frame 1 provided with the rib if can achieve reduction in weight, compared with the tank lower frames 1 shown in FIG. 3A to FIG. 3E.

In addition, although not shown, the tank lower frame 1 according to the embodiment may be one in which a filler is disposed in the hollow portion of the hollow member (tubular member). The filler is, for example, metal or resin. A material form of the filler is not limited, may be a block body, a plate body, a columnar body, a foamed body, a particulate body, and the like. Meanwhile, when the plate body is used for the filler, the plate body may be disposed in the hollow portion as a bulkhead (BHD).

The tank lower frame 1 described above can suppress the cross sectional deformation in a partial section where the filler is disposed.

It is noted that a preferable portion for disposing the filler is a position where a local cross sectional deformation is likely to take place. Specifically, the portion is, for example, an end portion 15 (see FIG. 1B), a center portion 16 (see FIG. 1B), and an inflection point 17 (see FIG. 4B) of the tank lower frame 1. In addition, although not shown, the portion is a jointing portion if the tank lower frame 1 is formed by combining two or more than two members.

Next, operations and effects of the vehicle body rear structure S according to the embodiment will be explained.

Figure 11A:
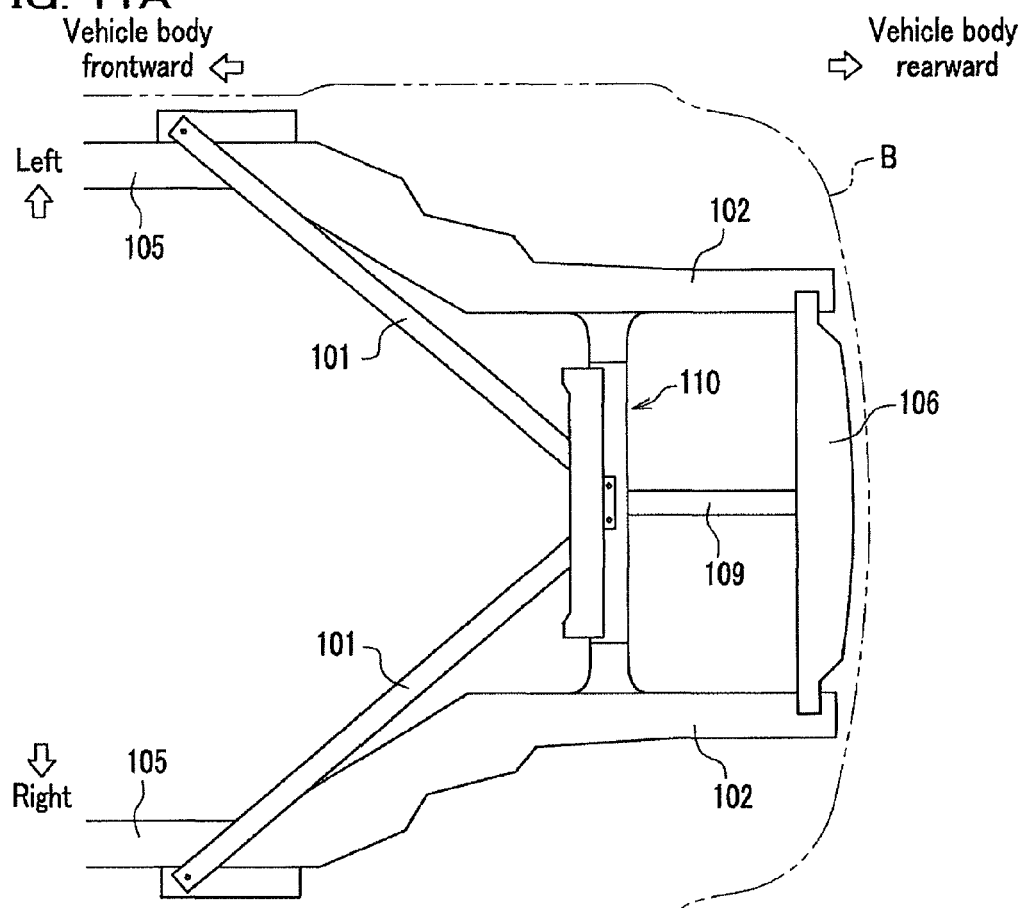
FIG. 11A is a bottom plane view schematically showing a conventional vehicle body rear structure as seen from a bottom side of a vehicle.
Figure 11B:
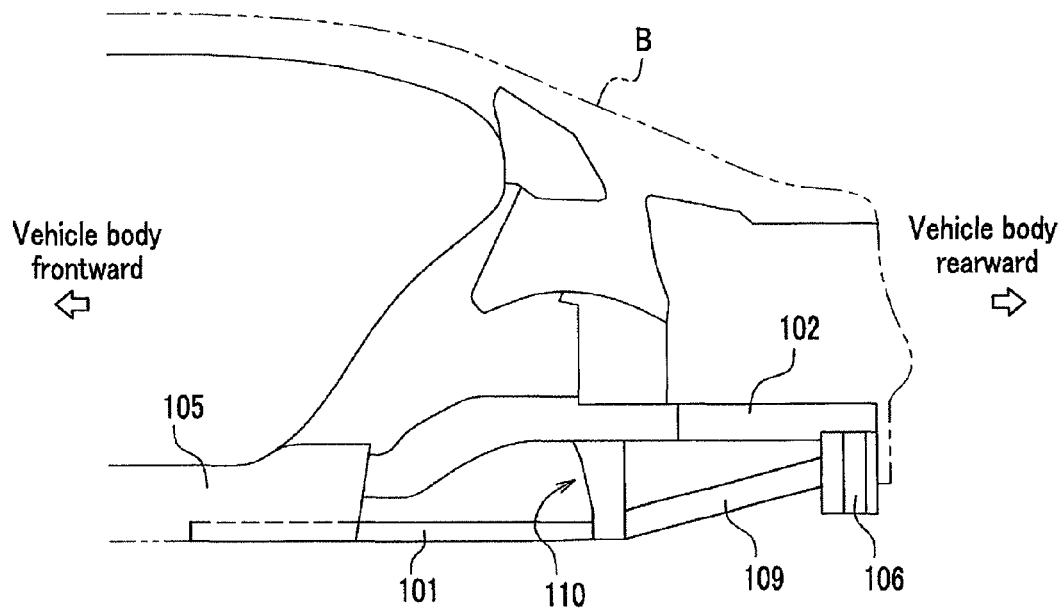
FIG. 11B is a side view schematically showing the conventional vehicle body rear structure as seen from a side of the vehicle.

As shown in FIG. 1B, in the vehicle body rear structure S, if the load F upon a rear-end collision is input in the bumper beam 8, the load F is transmitted to the side sills 5 via the rear floor end cross member 6, spare pan frames 9, rear floor cross member 10, and tank lower frames 1, as well as the load F is transmitted to the side sills 5 via the rear frames 2. That is, the load F is dispersed into directions of the rear frames 2 and spare pan frames 9. In this case, since the spare pan frames 2 are horizontally arranged different from the support member 109 (see FIG. 11B) of the conventional vehicle body rear structure (for example, see U.S. Pat. No. 6,834,910), the dispersed component of the load F in the direction of the spare pan frames 9 is efficiently transmitted to the tank lower frames 1 via the spare pan frames 9. As a result, the load F is effectively dispersed in the vehicle body rear structure S.

As shown in FIG. 1B, in the vehicle body rear structure S, if the dispersed component of the load F is input in the longitudinal direction of the tank lower frames 9, a load Fa which displaces the tank lower frames 9 in an upper direction (direction toward fuel tank T) or in lower direction (direction getting away from fuel tank T) is generated.

In this case, as described above, since the cross sectional deformation of the tank lower frame 1 is suppressed, the load in the load-displacement characteristic does not rapidly decrease after reaching a maximum of the load, and maintains a predetermined load, while increasing the displacement.

Therefore, a load-displacement characteristic of a whole vehicle body rear structure S is, as shown in FIG. 2, a combination of the load-displacement characteristic of the tank lower frame 1 and load-displacement characteristic of the rear frame 2 according to the embodiment ("vehicle body rear structure according to embodiment" in FIG. 2). That is, the load-displacement characteristic of the whole vehicle body rear structure S shows a maximum load L3 which is a sum of a maximum load L1 of the rear frame 2 and a predetermined load L2 of the tank lower frame 1, which is the maintained load of the tank lower frame 1 after reaching a maximum of the load.

On the contrary, the hollow member ("conventional stiffening member" in FIG. 2), which has been commonly used for the stiffening member, shows a load-displacement characteristic in which the load rapidly decreases after reaching a maximum of the load, which increases in response to the displacement. As a result, the load-displacement characteristic of the vehicle body rear structure provided with the conventional stiffening member shows a maximum load L1' which is close to the maximum load L1 of the rear frame 2.

If the load-displacement characteristic of the whole vehicle body rear structure S according to the embodiment is compared with that of the conventional whole vehicle body rear structure, the maximum load of the whole vehicle body rear structure S according to the embodiment is lager than that of the conventional whole vehicle body rear structure by L3-L1'.

Accordingly, the vehicle body rear structure S according to the embodiment can bear a large load upon a rear-end collision, compared with the conventional vehicle body rear structure.

In addition, in the vehicle body rear structure S according to the embodiment, since the tank lower frame 1 is displaced (deformed), while maintaining the predetermined load, a required strength of the whole vehicle body rear structure S can be obtained without increasing strengths of other frames such as the rear frames 2, side sills 5, rear floor end cross member 6, rear floor cross member 10, middle floor cross member 3, and spare pan frames 9. Therefore, in the vehicle body rear structure S described above, it is unnecessary to increase thicknesses and cross sectional areas of the materials used for the other frames, and to use a high-strength material for the other frames.

Accordingly, the vehicle body rear structure S according to the embodiment can achieve reductions in weight and manufacturing cost.

It is noted that the present invention is not limited to the embodiment described above and can be embodied in various forms.

In the other embodiments which will be explained hereinafter by referring to drawings as needed, a component identical to that of the embodiment described above is labeled the same symbol, and a detailed explanation of the component will be omitted.

Figure 4A:
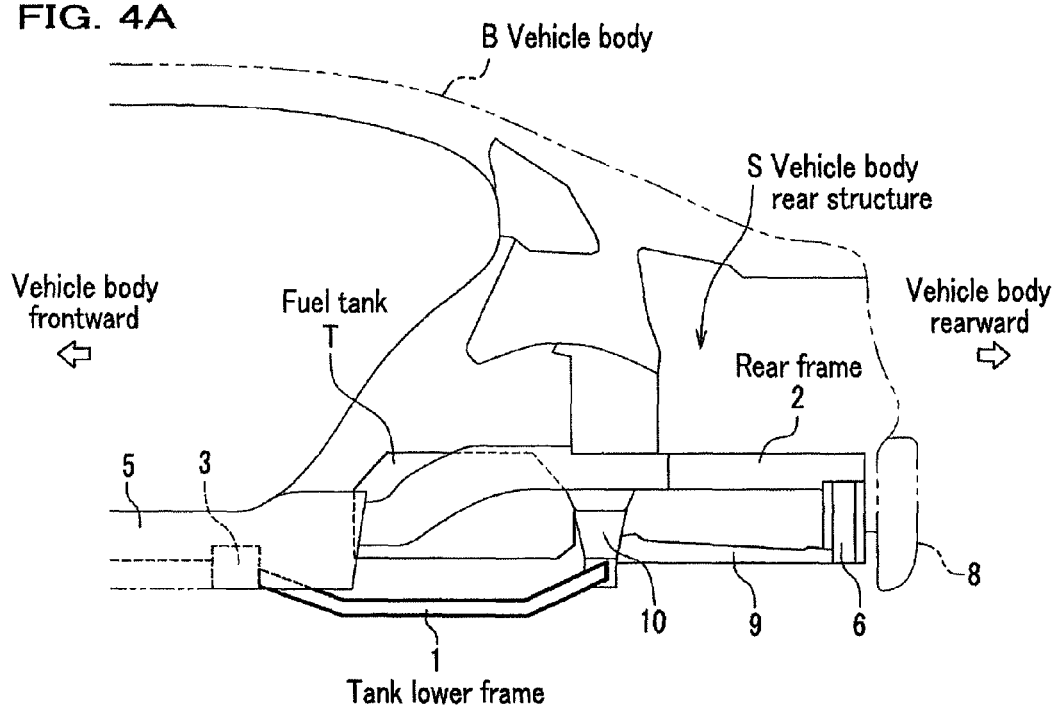
FIG. 4A is a side view schematically showing a vehicle body rear structure according to other embodiments.
Figure 4B:
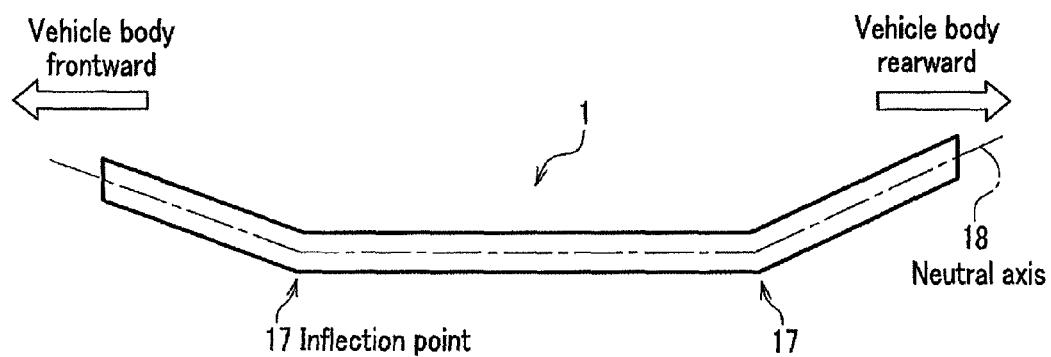
FIG. 4B and FIG. 4C are side views schematically showing tank lower frames constituting the vehicle body rear structure according to the other embodiments.
Figure 4C:
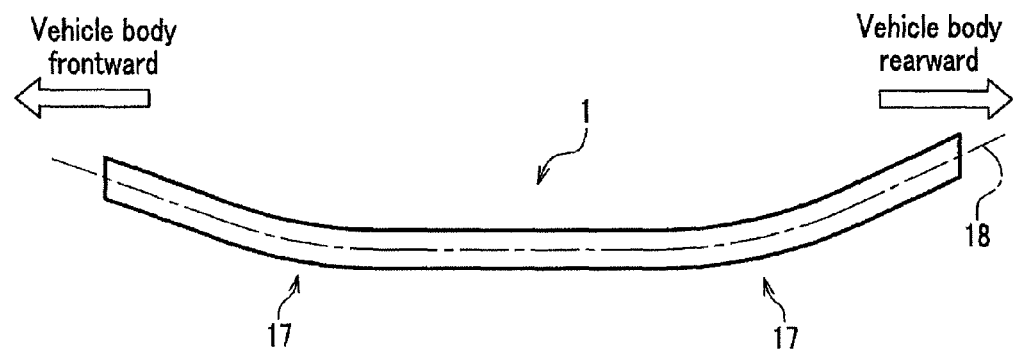
Figure 5A:
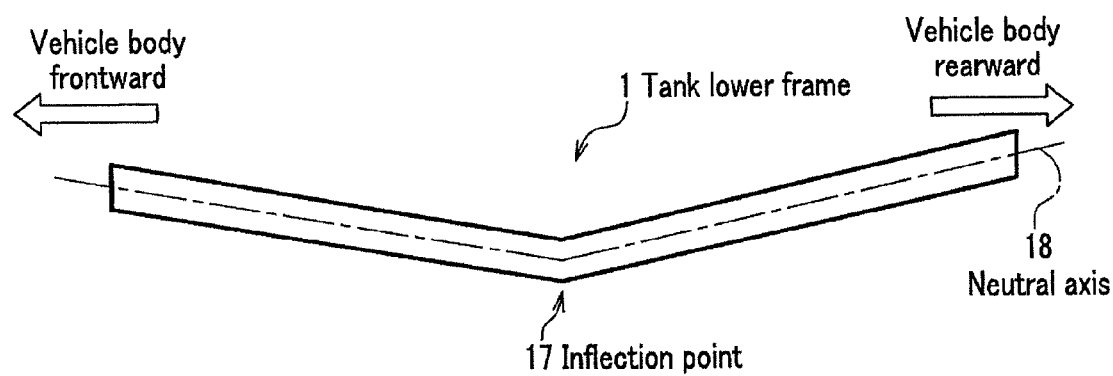
FIG. 5A and FIG. 5B are side views schematically showing tank lower frames constituting a vehicle body rear structure according to the other embodiments.
Figure 5B:
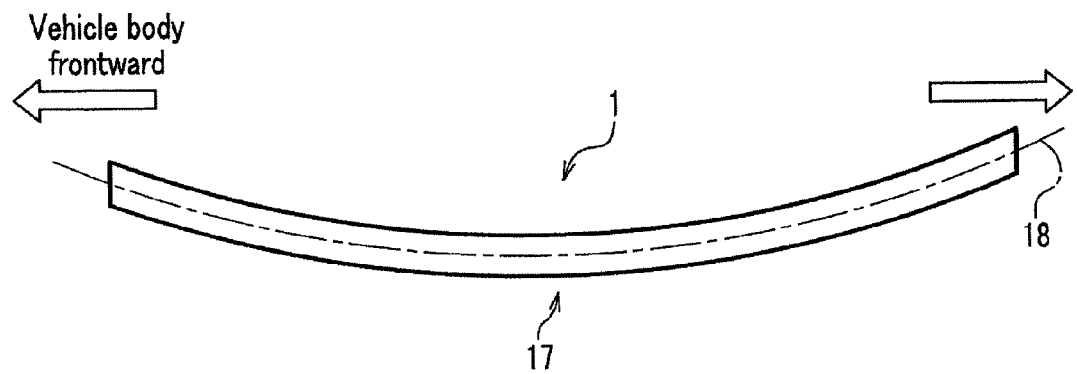

In the embodiment described above, the vehicle body rear structure S having a straight tank lower frame 1 has been explained. However, the present invention is not limited to the vehicle body rear structure S which uses the straight tank lower frame 1. FIG. 4A is a side view schematically showing a vehicle body rear structure according to other embodiments. FIG. 4B and FIG. 4C are side views schematically showing the vehicle body rear structure according to the other embodiments. FIG. 5A and FIG. 5B are side views schematically showing a tank lower frame constituting the vehicle body rear structure according to the other embodiments.

The vehicle body rear structure S shown in FIG. 4A is designed so that a bending deformation of the tank lower frame 1 takes place in a direction not to interfere with the fuel tank T upon a rear-end collision. In other words, the tank lower frame 1 is designed so that the bending deformation takes place in a direction getting away from the fuel tank T.

More specifically, the tank lower frame 1 has a shape protruding in a direction opposite to the fuel tank T. As shown in FIG. 4B, the tank lower frame 1 described above has two inflection points 17 in a longitudinal direction of the tank lower frame 1 so that a neutral axis 18 of the tank lower frame 1 has the shape protruding in the direction opposite to the fuel tank T (see FIG. 4A), that is, protruding in the bottom direction.

In addition, the tank lower frame 1 according to the embodiment described above is formed such that plate thicknesses and cross sectional shapes of the side wall 1a, upper wall 1b, and bottom wall 1c (see FIG. 3A) are identical in a longitudinal direction of the tank lower frame 1. In the tank lower frame 1 described above, the inflection points 17 can be formed by forming an external shape of the tank lower frame 1 so that an extending direction of the tank lower frame 1 is displaced.

The vehicle body rear structure S provided with the tank lower frame 1 described above has effects identical to those of the embodiment described above, and the tank lower frame 1 more certainly can avoid interference with the fuel tank T when the bending deformation of the tank lower frame 1 takes place upon a rear-end collision.

In addition, in the vehicle body rear structure S, since the tank lower frame 1 protrudes in the direction opposite to the fuel tank T, the fuel tank T having a larger capacity can be mounted on the vehicle.

In addition, in the vehicle body rear structure S, since the tank lower frame 1 shown in FIG. 4B can be formed, for example, by pressing the tank lower frame 1 according to the embodiment described above (see, for example, FIG. 1B), the vehicle body rear structure S which can avoid the interference with the fuel tank T can be easily manufactured.

In addition, the inflection points 17 of the tank lower frame 1 shown in FIG. 4B are formed by bending the tank lower frame 1 in the longitudinal direction. However, the present invention is not limited to this. For example, as shown in FIG. 4C, the inflection points 17 may be formed by bending the tank lower frame 1 with a predetermined curvature in the longitudinal direction.

In addition, the tank lower frame 1 shown in FIG. 4B has two inflection points 17 in the longitudinal direction. However, the present invention is not limited to this. For example, as shown in FIG. 5A, the tank lower frame 1 may have one inflection point 17 by bending the tank lower frame 1 in the longitudinal direction. In addition, as shown in FIG. 5B, the tank lower frame 1 may have one inflection point 17 by bending the tank lower frame 1 with a predetermined curvature in the longitudinal direction. Further, three or more than three inflection points 17 may be formed along the longitudinal direction of the tank lower frame 1.

In addition, the vehicle body rear structure S according to the embodiment described above may be one in which the tank lower frame 1 has a trigger for bending deformation so that the bending deformation of the tank lower frame 1 upon a rear-end collision takes place in a direction not to interfere with the fuel tank T. FIG. 6A to FIG. 6D are perspective views of tank lower frames which have a trigger for bending deformation.

Figure 6A:
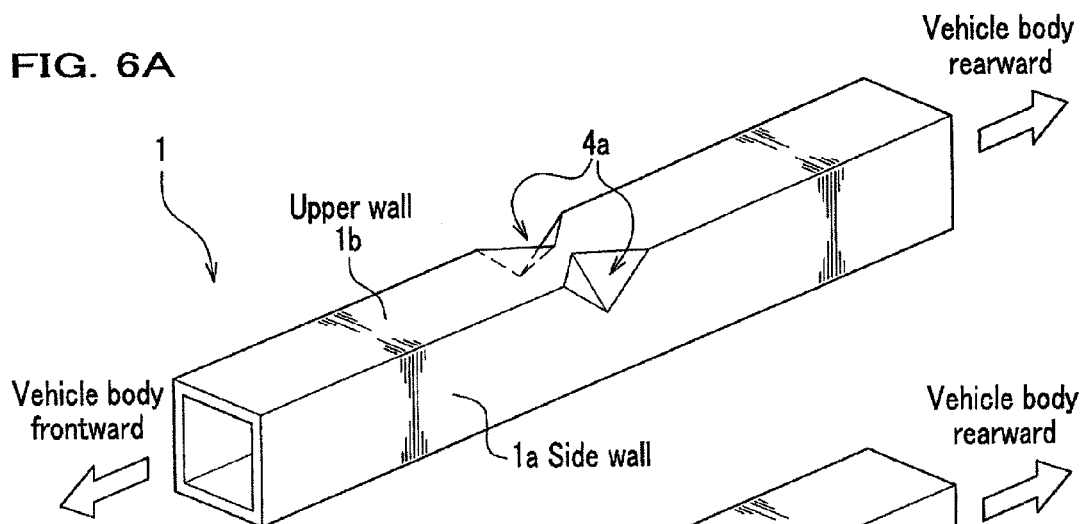
FIG. 6A to FIG. 6D are perspective views of tank lower frames each having a trigger for deformation.

The tank lower frame 1 shown in FIG. 6A has a pair of notches (or recesses) 4a on two edges formed by the upper wall 1b and side wall 1a. Each of the notches 4a is formed to face each other in a width direction of the tank lower frame 1. The notches 4a correspond to the "trigger for bending deformation". That is, the tank lower frame 1 shown in FIG. 6a is bending-deformed upon a rear-end collision in the direction not to interfere with the fuel tank T, that is, in the direction getting away from the fuel tank T by being deformed starting from the notches 4a.

In the vehicle body rear structure S, since the tank lower frame 1 shown in FIG. 6A can be formed, for example, by pressing and cutting the tank lower frame 1 according to the embodiment described above (see, for example, FIG. 1B), the vehicle body rear structure S which can avoid the interference with the fuel tank T can be easily manufactured.

Figure 6B:
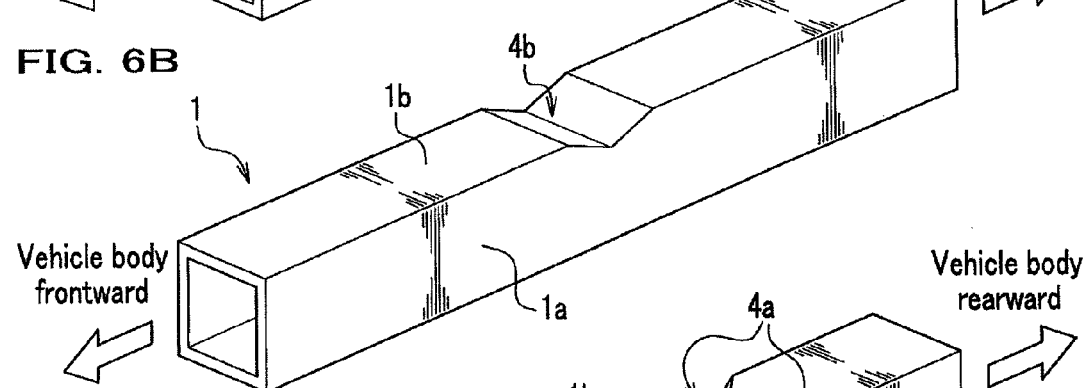

In addition, the tank lower frame 1 shown in FIG. 6A has the pair of notches 4a. However, the present invention is not limited to this. For example, as shown in FIG. 6B, the tank lower frame 1 may have one bead 4b on the upper wall 1b. The bead 4b corresponds to the "trigger for bending deformation" described above.

Figure 6C:
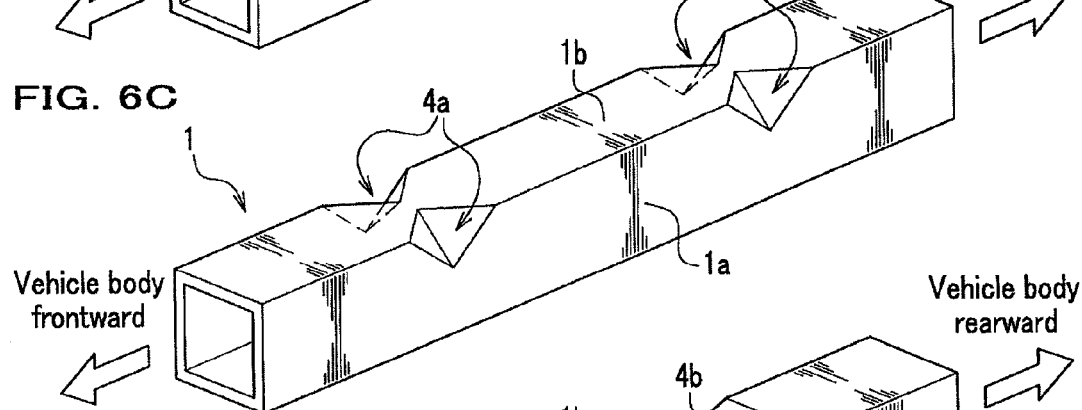
Figure 6D:
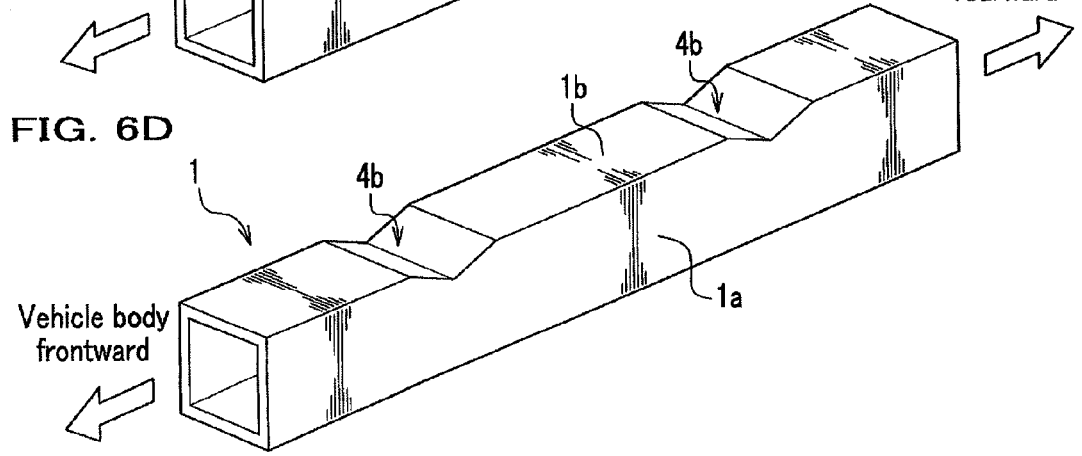

In addition, the tank lower frame 1 shown in FIG. 6A includes the pair of notches 4a as the "trigger for bending deformation", and the tank lower frame 1 shown in FIG. 6B includes the one bead 4b as the "trigger for bending deformation". However, the present invention is not limited to these. For example, as shown in FIG. 6C, the tank lower frame 1 may include two pairs of notches 4a in a longitudinal direction of the tank lower frame 1, and may include two beads 4b in the longitudinal direction as shown in FIG. 6D. In addition, the tank lower frame 1 may include tree or more pairs of the notches 4a, or three or more beads 4b along the longitudinal direction.

Figure 7A:
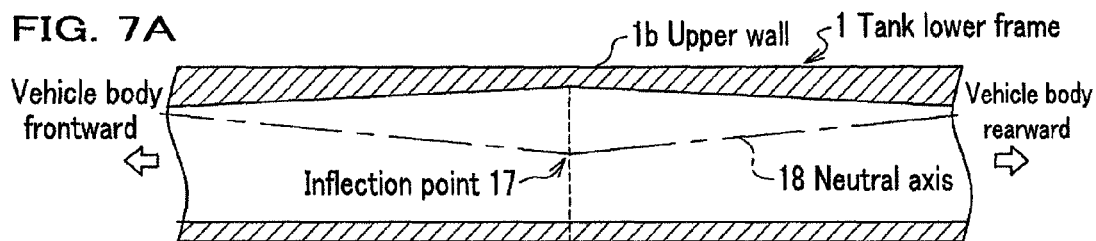
FIG. 7A is a cross sectional view showing a tank lower frame in which a thickness of an upper wall of the tank lower frame is varied in a longitudinal direction of the upper wall.
Figure 7B:
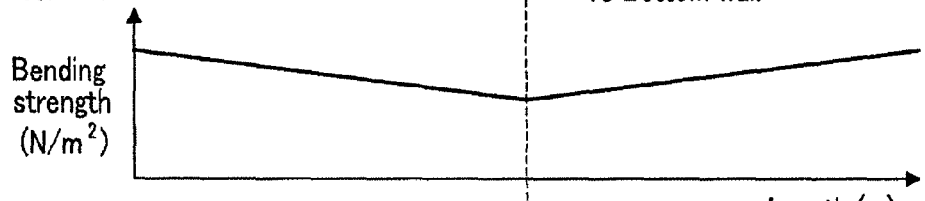
FIG. 7B is a graph showing a variation of a bending strength of the upper wall against the longitudinal direction of the upper wall, and vertical and horizontal axes indicate the bending strength ($N/m^2$) and a length (m) of the tank lower frame shown in FIG. 7A, respectively.
Figure 7C:
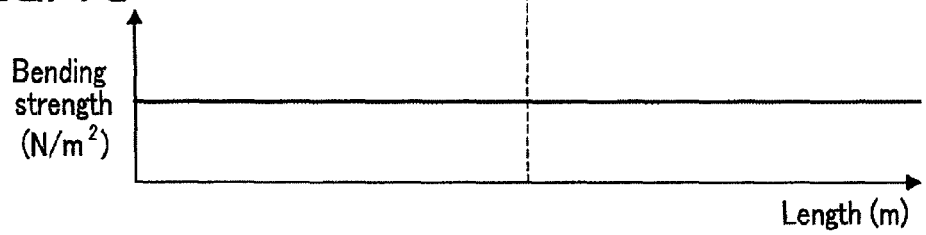
FIG. 7C is a graph showing a variation of a bending strength of a bottom wall against a longitudinal direction of the bottom wall, in which vertical and horizontal axes indicate the bending strength ($N/m^2$) and the length (m) of the tank lower frame shown in FIG. 7A, respectively.

In addition, in the embodiment described above, the plate thicknesses of the upper wall 1b and bottom wall 1c of the tank lower frame 1 are constant in each of their longitudinal directions. However, the present invention is not limited to this. FIG. 7A is a cross sectional view showing a tank lower frame 1 in which a thickness of an upper wall 1b of the tank lower frame 1 is varied in a longitudinal direction of the upper wall. FIG. 7B is a graph showing a variation of a bending strength of the upper wall against the longitudinal direction of the upper wall. FIG. 7C is a graph showing a variation of a bending strength of a bottom wall against a longitudinal direction of the bottom wall. Vertical axes of FIG. 7B and FIG. 7C indicate a bending strength (N/m$^2$), and horizontal axes of FIG. 7B and FIG. 7C indicate a length (m) of the tank lower frame shown in FIG. 7A.

A thickness of the upper wall 1b of the tank lower frame 1 shown in FIG. 7A is thin in a center portion of the upper wall 1b and gradually becomes thicker from the center portion to each end of the upper wall 1b. On the other hand, a thickness of the bottom wall 1c is constant in a longitudinal direction of the tank lower frame 1. It is noted that the thickness of the bottom wall 1c in the embodiment is designed substantially identical to that of the center portion of the upper wall 1b.

As shown in FIG. 7B, a bending strength of the upper wall 1b of the tank lower frame 1 shown in FIG. 7A is small in the center portion of the upper wall 1b, and gradually becomes larger from the center portion to the each end of the upper wall 1b. On the other hand, as shown in FIG. 7C, a bending strength of the bottom wall 1c is constant in the longitudinal direction of the tank lower frame 1. As a result, as shown in FIG. 7A, a neutral axis of the tank lower frame 1 protrudes in a direction to the bottom wall 1c, and the inflection point 17 is formed in the center portion of the upper wall 1b corresponding to the thinnest portion of the upper wall 1b. That is, in the vehicle body rear structure S provided with the tank lower frame 1 described above, the tank lower frame 1 is deformed so that the tank lower frame 1 gets away from the fuel tank T when the tank lower frame 1 is bending-deformed upon a rear-end collision.

Therefore, the vehicle body rear structure S provided with the tank lower frame 1 shown in FIG. 7A has effects identical to those of the embodiment described above, and can avoid the interference with the fuel tank T when the tank lower frame 1 is bending-deformed upon a rear-end collision.

In addition, in the vehicle body rear structure S provided with the tank lower frame 1 shown in FIG. 7A, securing of a ground clearance of a vehicle becomes easy, compared with the vehicle body rear structure S provided with the tank lower frame 1 which protrudes downward as shown in FIG. 4A.

Figure 8A:
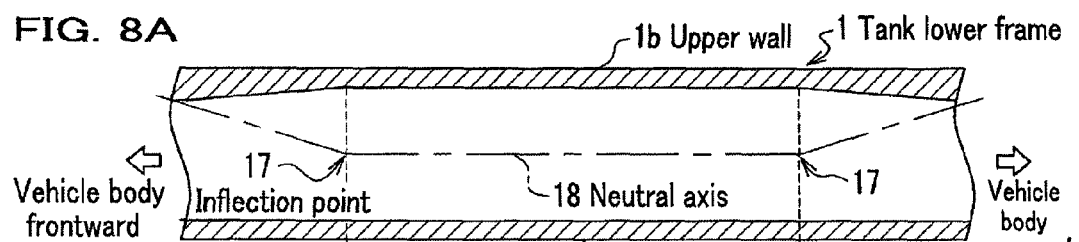
FIG. 8A is a cross sectional view showing a tank lower frame in which a thickness of an upper wall of the tank lower frame is varied in a longitudinal direction of the upper wall.
Figure 8B:
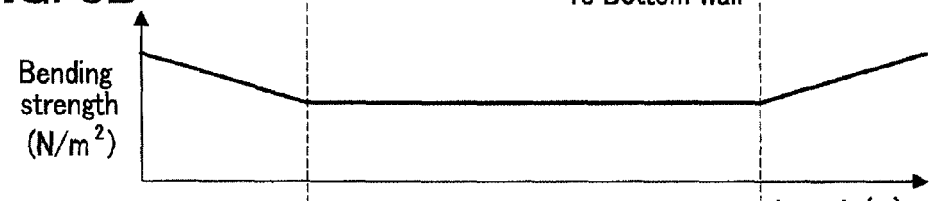
FIG. 8B is a graph showing a variation of a bending strength of the upper wall against the longitudinal direction of the upper wall, in which vertical and horizontal axes indicate the bending strength ($N/m^2$) and a length (m) of the tank lower frame shown in FIG. 8A, respectively.
Figure 8C:
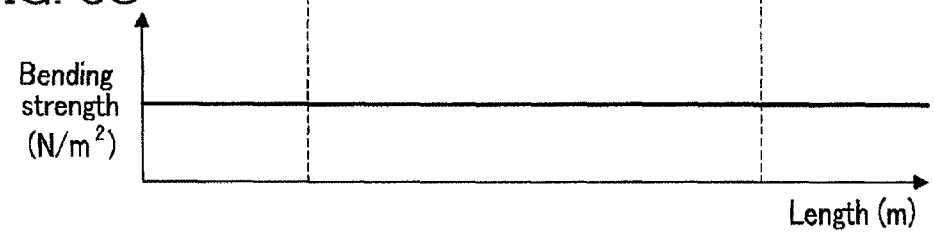
FIG. 8C is a graph showing a variation of the bending strength of a bottom wall against a longitudinal direction of the bottom wall, and vertical and horizontal axes indicate the bending strength ($N/m^2$) and the length (m) of the tank lower frame shown in FIG. 8A, respectively.

In addition, although the bending strength of the tank lower frame 1 shown in FIG. 7A is small in the center portion of the upper wall 1b and gradually becomes larger from the center portion to the each end of the upper wall 1b, the present invention is not limited to this. FIG. 8A is a cross sectional view showing a tank lower frame in which a thickness of an upper wall of the tank lower frame is varied in a longitudinal direction of the upper wall. FIG. 8B is a graph showing a variation of a bending strength of the upper wall against the longitudinal direction of the upper wall. FIG. 8C is a graph showing a variation of the bending strength of a bottom wall against a longitudinal direction of the bottom wall. Vertical axes of FIG. 8B and FIG. 8C indicate a bending strength (N/m$^2$), and horizontal axes of FIG. 8B and FIG. 8C indicate a length (m) of the tank lower frame shown in FIG. 8A.

A thickness of the upper wall 1b of the tank lower frame 1 shown in FIG. 8A is constant in a middle portion of the upper wall 1b and gradually becomes thicker from the middle portion to each end of the upper wall 1b. On the other hand, a thickness of the bottom wall 1c of the tank lower frame 1 shown in FIG. 8A is constant in a longitudinal direction of the bottom wall 1c. It is noted that the thickness of the bottom wall 1c in the embodiment is designed substantially identical to that of the middle portion of the upper wall 1b.

As shown in FIG. 8B, the bending strength of the upper wall 1b of the tank lower frame 1 shown in FIG. 8A is small in the middle portion of the upper wall 1b, and gradually becomes larger from the middle portion to the each end of the upper wall 1b. On the other hand, as shown in FIG. 8C, a bending strength of the bottom wall 1c is constant in the longitudinal direction of the tank lower frame 1. As a result, as shown in FIG. 8A, a neutral axis 18 of the tank lower frame 1 protrudes in a direction to the bottom wall 1c, and the inflection point 17 is formed at each of two boundary positions from which the thickness of the upper wall 1b increases. That is, in the vehicle body rear structure S provided with the tank lower frame 1 described above, the tank lower frame 1 is deformed so that the tank lower frame 1 gets away from the fuel tank T when the tank lower frame 1 is bending-deformed upon a rear-end collision.

Figure 9A:
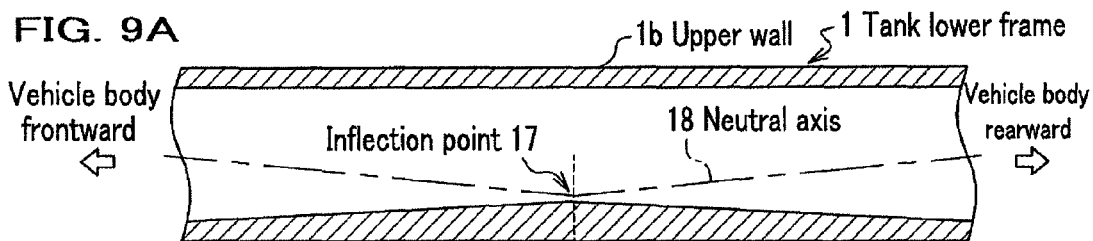
FIG. 9A is a cross sectional view showing a tank lower frame in which a thickness of a bottom wall of the tank lower frame is varied in a longitudinal direction of the bottom wall.
Figure 9B:
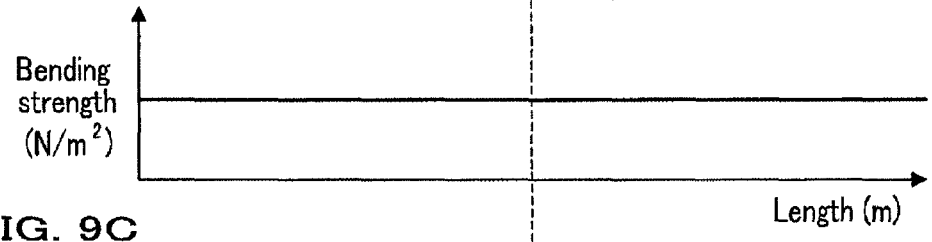
FIG. 9B is a graph showing a variation of a bending strength of an upper wall against a longitudinal direction of the upper wall, in which vertical and horizontal axes indicate the bending strength ($N/m^2$) and a length (m) of the tank lower frame shown in FIG. 9A, respectively.
Figure 9C:
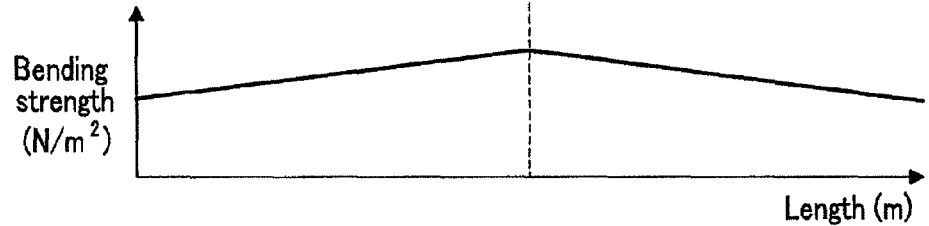
FIG. 9C is a graph showing a variation of a bending strength of the bottom wall against the longitudinal direction of the bottom wall, in which vertical and horizontal axes indicate the bending strength ($N/m^2$) and the length (m) of the tank lower frame shown in FIG. 9A, respectively.

In addition, in the tank lower frames 1 shown in FIG. 7A and FIG. 8A, the thickness of the upper wall 1b is varied. However, the thickness of the bottom wall 1c may be varied. FIG. 9A is a cross sectional view showing a tank lower frame in which a thickness of a bottom wall of the tank lower frame is varied in a longitudinal direction of the bottom wall. FIG. 9B is a graph showing a variation of a bending strength of an upper wall against a longitudinal direction of the upper wall. FIG. 9C is a graph showing a variation of a bending strength of the bottom wall against the longitudinal direction of the bottom wall. Vertical axes of FIG. 9B and FIG. 9C indicate a bending strength (N/m$^2$), and horizontal axes of FIG. 9B and FIG. 9C indicate a length (m) of the tank lower frame shown in FIG. 9A.

A thickness of the bottom wall 1c of the tank lower frame 1 shown in FIG. 9A is thick in a center portion and gradually becomes thinner from the center portion to each end of the bottom wall 1c. On the other hand, a thickness of the upper wall 1c is constant in the longitudinal direction of the tank lower frame 1.

As shown in FIG. 9B, a bending strength of the upper wall 1b of the tank lower frame 1 shown in FIG. 9A is constant in the longitudinal direction of the tank lower frame 1. On the other hand, as shown in FIG. 9C, a bending strength of the bottom wall 1c is large in the center portion and gradually becomes smaller from the center portion to each end of the bottom wall 1c. As a result, as shown in FIG. 9A, a neutral axis of the tank lower frame 1 protrudes in a direction to the bottom wall 1c, and the inflection point 17 is formed at the thickest position in the center portion of the bottom wall 1c. That is, in the vehicle body rear structure S provided with the tank lower frame 1 described above, the tank lower frame 1 is deformed so that the tank lower frame 1 gets away from the fuel tank T when the tank lower frame 1 is bending-deformed upon a rear-end collision.

Figure 10A:
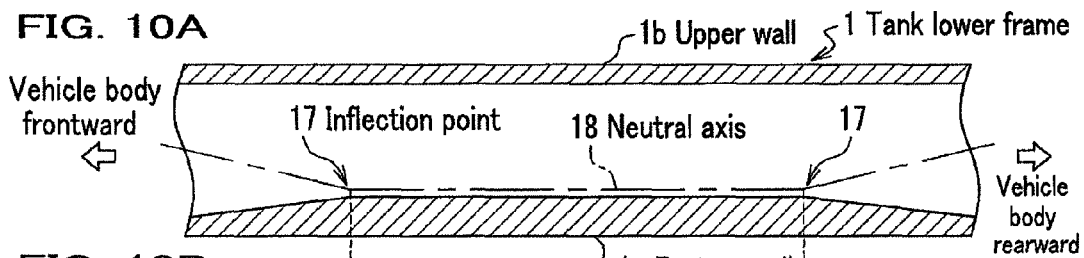
FIG. 10A is a cross sectional view showing a tank lower frame in which a thickness of a bottom wall of the tank lower frame is varied in a longitudinal direction of the bottom wall.
Figure 10B:
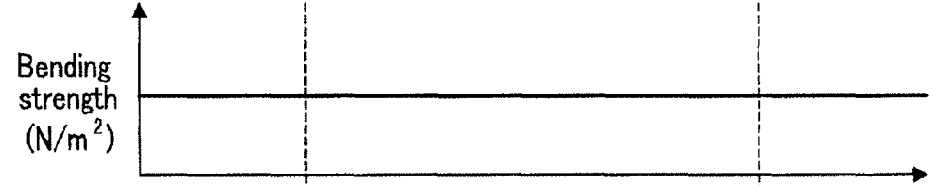
FIG. 10B is a graph showing a variation of a bending strength of an upper wall against a longitudinal direction of the upper wall, in which vertical and horizontal axes indicate the bending strength ($N/m^2$) and a length (m) of the tank lower frame shown in FIG. 10A, respectively.
Figure 10C:
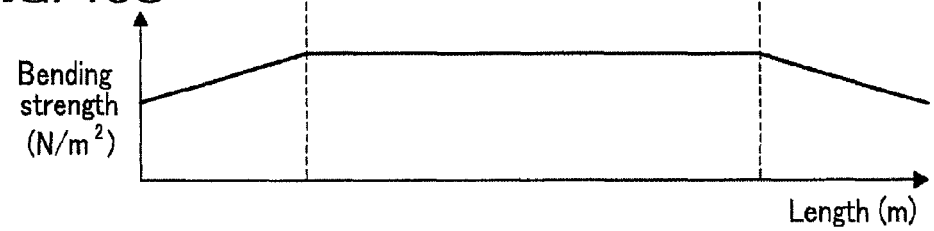
FIG. 10C is a graph showing a variation of a bending strength of the bottom wall against the longitudinal direction of the bottom wall, in which vertical and horizontal axes indicate the bending strength ($N/m^2$) and the length (m) of the tank lower frame shown in FIG. 10A, respectively.

In addition, although the bending strength of the tank lower frame 1 shown in FIG. 9A is large in the center portion of the bottom wall 1c and gradually becomes smaller from the center portion to the each end of the bottom wall 1c, the present invention is not limited to this. FIG. 10A is a cross sectional view showing a tank lower frame 1 in which a thickness of a bottom wall 1c of the tank lower frame 1 is varied in a longitudinal direction of the bottom wall 1c. FIG. 10B is a graph showing a variation of a bending strength of an upper wall against a longitudinal direction of the upper wall. FIG. 10C is a graph showing a variation of a bending strength of the bottom wall against the longitudinal direction of the bottom wall. Vertical axes of FIG. 10B and FIG. 10C indicate a bending strength ($N/m^2$), and horizontal axes of FIG. 10B and FIG. 10C indicate a length (m) of the tank lower frame shown in FIG. 10A.

A thickness of the bottom wall 1c of the tank lower frame 1 shown in FIG. 10A is constant in a middle portion of the bottom wall 1c, and gradually becomes thinner from the middle portion to each end of the bottom wall 1c. On the other hand, a thickness of the upper wall 1b of the tank lower frame 1 is constant in a longitudinal direction of the upper wall 1b.

As shown in FIG. 10B, a bending strength of the upper wall 1b of the tank lower frame 1 shown in FIG. 10A is constant in the longitudinal direction of the tank lower frame 1. On the other hand, a bending strength of the bottom wall 1c is large in the middle portion of the bottom wall 1c, and gradually becomes smaller from the middle portion to the each end of the bottom wall 1c. As a result, as shown in FIG. 10A, a neutral axis 18 of the tank lower frame 1 protrudes in a direction to the bottom wall 1c, and the inflection point 17 is formed at each of two boundary positions from which the thickness of the bottom wall 1c decreases. That is, in the vehicle body rear structure S provided with the tank lower frame 1 described above, the tank lower frame 1 is deformed so that the tank lower frame 1 gets away from the fuel tank T when the tank lower frame 1 is bending-deformed upon a rear-end collision.

In addition, in the tank lower frames 1 shown in FIG. 7A, FIG. 8A, FIG. 9A, and FIG. 10A, the inflection point 17 is formed on the neutral axis 18 of the tank lower frame 1 by varying a thickness distribution of the upper wall 1b or bottom wall 1c. However, the present invention is not limited to this. The inflection point 17 may be formed on the neutral axis 18 of the tank lower frame 1 by varying thickness distributions of the upper wall 1b and bottom wall 1c.

In addition, the inflection point 17 may be formed on the neutral axis 18 by forming a portion having a different strength in a longitudinal direction of the tank lower frame 1, by arranging a different material for the tank lower frame 1 in the longitudinal direction. In addition, the inflection point 17 may be formed on the neutral axis 18 of the tank lower frame 1 by partially forming a rib on at least one of the upper wall 1b and bottom wall 1c, or by varying a height or width of the rib. It is preferable that the rib is formed to extend along the longitudinal direction of the tank lower frame.

What is claimed is:

1. A vehicle body rear structure, comprising:
   first and second rear frames disposed respectively on each side of a vehicle body; and
   first and second tank lower frames disposed respectively beneath the rear frame on the each side of the vehicle body,
   wherein the rear frames have a load-displacement characteristic having a ratio F/S of load F to displacement S larger than the ratio F/S of the tank lower frames, and a cross sectional deformation of the tank lower frames is suppressed so that the load F does not rapidly decrease after reaching a maximum of a bending strength,
   the vehicle body rear structure, further comprising:
   a rear floor end cross member (6) jointed to each rear end of the rear frames,
   a rear floor cross member (10) located ahead of the rear floor end cross member (6) and extending in the vehicle width direction and jointed to each of the rear frames,
   a middle floor cross member (3) extending in the vehicle width direction to be jointed to each of front floor frames (7a) and each of side sills (5);
   a rear floor panel extending toward a rear portion of the vehicle body (B) from the middle floor cross member (3),
   a pair of spare pan frames (9) extending in the front-rear direction between the rear floor end cross member (6) and rear floor cross member (10) and jointed to the rear floor end cross member (6) and rear floor cross member (10), each of the spare pan frames (9) being arranged to be located on each side of a spare pan which is disposed in a rear portion of the rear floor panel and having a concave portion for storing a spare tire, and the spare pan frames (9) being disposed substantially horizontally from the rear floor end cross member (6) to rear floor cross member (10),
   wherein each rear end of the tank lower frames is jointed to substantially a center of the rear floor cross member (10) in the vehicle width direction, each of the tank lower frames extends substantially in a V-shape toward each side of the vehicle body (B) from the rear floor cross member (10), and each front end of the tank lower frames is jointed to a portion close to a place, where the middle floor cross member (3) is jointed, of each of the side sills (5),
   wherein the tank lower frames are disposed beneath the rear frames and a fuel tank (T), and extend substantially horizontally toward the middle floor cross member (3) from the rear floor cross member (10), and a horizontal height of the tank lower frames is set to be substantially identical to the height of the spare pan frames (9).

2. The vehicle body rear structure according to claim 1, wherein each tank lower frame is made of a hollow member, and the cross sectional deformation is suppressed by making a side wall of the tank lower frame thicker than upper and bottom walls of the tank lower frame.

3. The vehicle body rear structure according to claim 1, wherein each tank lower frame is made of a hollow member, and the cross sectional deformation is suppressed by disposing at least one of a rib, a plate, and a filler inside the tank lower frame.

4. The vehicle body rear structure according to claim 1, wherein each tank lower frame is designed so that a bending deformation of the tank lower frame takes place in a direction getting away from the fuel tank.

5. The vehicle body rear structure according to claim 4, wherein each tank lower frame is formed to protrude in a direction opposite to the fuel tank.

6. The vehicle body rear structure according to claim 4, wherein each tank lower frame has a trigger for the bending deformation on a fuel tank side.

7. The vehicle body rear structure according to claim 1, wherein an inflection point of each tank lower frame is set so that a neutral axis of the tank lower frame protrudes in a direction opposite to a fuel tank.

8. The vehicle body rear structure according to claim 7, wherein a cross sectional shape of each tank lower frame and a thickness of a plate forming each tank lower frame are constant in a longitudinal direction of the tank lower frame, and the inflection point is set by forming an external shape of each tank lower frame so that an extending direction of the tank lower frame is displaced.

9. The vehicle body rear structure according to claim 7, wherein the inflection point is set by varying a thickness distribution and material strength of a plate forming the tank lower frame in a longitudinal direction of the tank lower frame.

10. The vehicle body rear structure according to claim 7, wherein each tank lower frame includes a rib extending along a longitudinal direction of the tank lower frame, and the inflection point is set by disposing the rib.

11. The vehicle body rear structure according to claim 1, wherein:
the two spare pan frames are U-shaped members with an open upper face.

12. The vehicle body rear structure according to claim 1, wherein each tank lower frame transmits a load upon a rear-end collision to a framework, which is located ahead of the tank lower frame, of the vehicle body.

* * * * *